Feb. 28, 1967    C. L. KRAKAUER    3,305,879
TORSION SPRING AND MATTRESS EDGE
Filed March 3, 1965
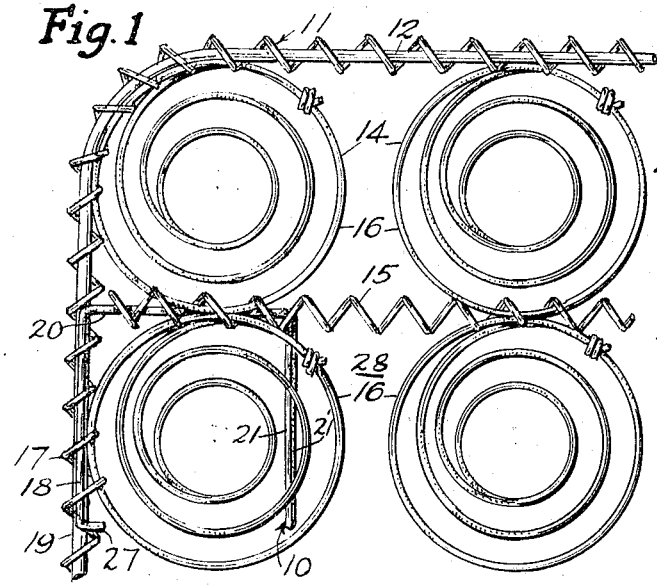
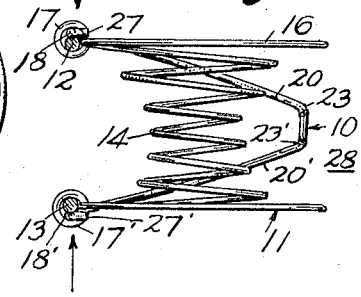
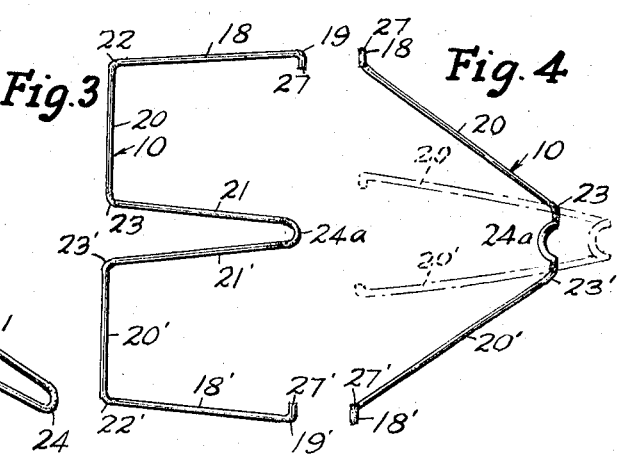
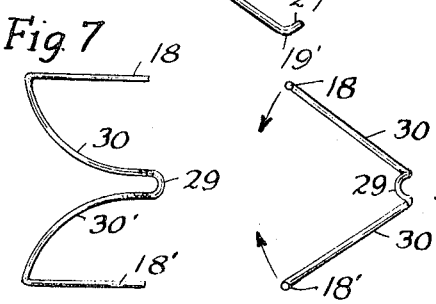
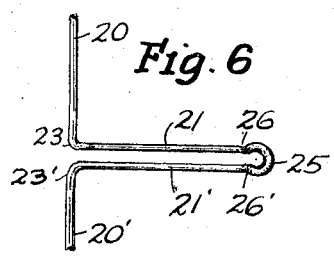
INVENTOR.
C. Leonard Krakauer
BY
*Harry Jacobson*
ATTORNEY

United States Patent Office 3,305,879
Patented Feb. 28, 1967

3,305,879
TORSION SPRING AND MATTRESS EDGE
C. Leonard Krakauer, Roslyn Heights, N.Y., assignor to Kay Manufacturing Corp., Brooklyn, N.Y., a corporation of New York
Filed Mar. 3, 1965, Ser. No. 436,863
14 Claims. (Cl. 5—260)

This invention relates to wire torsion springs and to structures in which such springs are employed, such as a yieldable mattress edge stiffener.

The best known application of a so-called "torsion" spring is in the well known safety pin when a pair of arms radiate out from a substantially central coil in a length of spring wire. While the term "torsion" is customarily used to designate the safety pin type of springs, the term is in a fact a misnomer. The coils of such springs are subjected to bending though they exert tension or compression in a circular direction around the axis of the coils in distinction from tension and compression springs which are subjected to torsion though they exert tension or compression in a direction parallel to their axes.

So-called "torsion" springs have many uses and are employed in numerous and varied environments. Some examples are in door checks, spring hinges, automobile trunk lids and mattress edge stiffeners. They are especially useful where the outer ends of diverging arms are pivoted to swing substantially circumferentially about a point near the inner ends of the diverging arms.

As one phase hereof, the present invention is directed to the provision of a torsion spring in which the coils of the known "torsion" spring are eliminated and are replaced by a torsion member so shaped as actually to be subjected to torsion instead of bending, the substitution utilizing the principle that spring materials act most efficiently in torsion.

The invention is further directed to the provision of a torsion spring substantially symmetrical about its center line, each half thereof being substantially coextensive with the other and arranged in a different plane which is positioned at an angle to the plane of the other similar half, each half being generally C-shaped, L-shaped, Z-shaped, or in the shape of an open segment of any suitable geometric configuration.

The invention is further directed to the provision of a wire torsion spring wherein the coil or coils are replaced by a generally U-shaped torsion element in the general shape of a hairpin or the like or in the shape of two elongated coextensive slightly separated sides joined at an end by an approximately 180° bend and open at the other end.

As another phase hereof, the invention is directed to the provision of an economical but efficient edge spring for mattresses so designed and adapted to be so installed that it is subjected largely to torsional stresses which can be more advantageously resisted by spring wire than bending stresses with the result that the edge spring or stiffener can be made of one piece of relatively thin wire with little increase in the weight or cost of the mattress in which it is installed.

The invention is further directed to the arrangement of the spaced terminal attaching arms of the edge stiffener spring in somewhat divergent or non-parallel relation before the installation thereof in the spring unit of the mattress, whereby the stiffener is prestressed on installation and offers considerable resistance initially to the load even when the user first sits on or rolls over to the mattress edge, it being highly desirable for comfort when sitting, and to prevent the user from rolling off the edge when lying down.

The invention is further directed to the provision of an inner spring unit for a mattress having a stabilized or adequately supported edge free of wire in the vertical plane between the upper and lower border wires of the unit, but adequately resistant both to initial loading and also to continued loading, the major part of the torsion stiffener spring of the unit being arranged inside of the border wires and on the inside of the unit, and being adapted for independent installation in already exisiting units.

The various objects of the invention will be clear from the description which follows and from the drawings, in which FIG. 1 is a fragmentary top plan view of the inner spring unit of a mattress to which the invention has been applied, showing one form of the torsion spring in place.

FIG. 2 is a fragmentary front elevational view, partly in section, of an edge part of the unit, showing an edge coil spring and the cooperating torsion spring partly compressed by a load acting in the direction of the arrows upon the border wires and the adjacent structure.

FIG. 3 is a side elevational view of a modified form of the torsion spring of generally E-shaped configuration as it appears when unstressed.

FIG. 4 is a front elevational view of FIG. 3, similar to FIG. 2, showing in dash-dot lines the highly compressed state of the spring.

FIG. 5 is an isometric view of the torsion spring shown in FIGS. 1 and 2.

FIG. 6 is a fragmentary elevational view of a modified form of the U-shaped middle section of the spring and of the connecting bend for the torsion bars thereof.

FIG. 7 is a view similar to FIG. 3 of a modified form of the spring in which the stress transmitting member and the torsion bar are not joined by an abrupt bend but are smoothly joined along a large curve, the stops on the terminal arms of the spring being omitted.

FIG. 8 is a front elevational view of FIG. 7.

It will be understood that in what follows, the proportions and exact shapes of the various elements of the spring may be greatly varied, depending on the use to which the spring is put, though the general arrangement of a pair of transversely spaced apart torsion bars instead of coils and of the means for applying twisting force to said bars, is common to all forms of the invention.

In the form of the invention shown for illustrative purposes, as applied to the inner spring unit of a mattress, the spring 10 is installed at any desired point along the edge of the inner spring unit as 11. Said unit as shown, is of a conventional type, having an upper border wire 12, a lower border wire 13, upright coil springs 14 and helicals 15 connecting the enlarged top coils 16 of adjacent coil springs, as well as similar helicals connecting the similar bottom coils of the adjacent springs. The upper and lower border wire helicals 17 and 17' connect the respective end coils of the springs 14 to the top and bottom border wires.

The torsion spring 10 is made of a single piece of spring wire and is generally of two similar shaped halves or elements joined together to form a middle and generally relatively narrow U-shaped torsion section. Each element is preferably C-shaped and lies in a different inclined plane from that of the other half of the spring and is disposed in a plane arranged angularly or at less than an angle of 180° to the plane of the other half of the spring. The upper terminal load receiving arm 18 of the upper C-shaped element and the similar lower terminal arm 18' of the lower C-shaped element have free end portions 19 and 19' at the respective ends thereof. Such arms are advantageous for use in an edge stiffening spring, for receiving or reacting to the load, but may be considerably shortened or entirely omitted in other applications of the torsion spring. Each of said arms is preferably twisted or bent slightly out of the general plane of the U-shaped section of the spring to spread the free ends of the arms apart to a greater distance between them than are the opposite ends of the arms, as best seen in FIG. 3, and so that said free ends and the major part of each of the arms lies in a plane other than that passing through the members 20 and 21.

Each element includes the inclined stress transmitting member 20 or 20', the torsion bar 21 or 21' constituting transversely spaced apart and co-extensive sides of the torsion section, and the terminal arm 18 or 18' constituting all of the parts of the C-shaped element, and which parts are here illustrated as being straight. The bend 22 integrally joins one end of the terminal arm 18 to one end of the stress transmitting member 20, the other end of which is similarly integrally joined by the bend 23 to one end of the torsion bar 21. As best seen in FIGS. 3 and 5, said bends are relatively sharp or abrupt and the torsion bars 21 and 21' of the respective C-shaped elements preferably converge somewhat in a direction away from the bends 23 and 23'. The integral connecting bend 24 for the transversely spaced apart ends of the similar torsion bars opposite the bends 23 and 23' subtends somewhat less than 180° to form with the bars a generally horizontally disposed U-shaped torsion or hairpin-like section substantially coextensive with the terminal arms 18 and 18'. The precise shape of said section may be considerably varied so long as it has two coextensive transversely spaced sides, joined at one end by a bend and open at the other end.

As shown in FIGS. 3 and 4, the bend 24a at and joining adjacent ends of the sides or bars 21 and 21' of the middle U-shaped section of the spring, is offset out of the plane of said bars.

In the modified form of FIG. 6, the connecting bend 25 subtends somewhat more than 180° and results in slight indents 26, 26' where the bend joins the torsion bars. Optionally, the free end portions 19 and 19' of the terminal arms may be bent substantially perpendicularly from the arms toward the respective bars 21 and 21' to provide suitable stops 27 and 27' preventing sliding of the spring out of the position in which it is installed in the inner spring unit. Such stops are useful to the best advantage with springs installed in the unit in the position shown in FIGS. 1 and 2 as or before the helicals 17 and 17' are assembled with the unit. In cases where the spring is installed in existing mattress units, the extending stops 27 and 27' may well be omitted.

The compressive forces on the mattress edge, if concentrated at an area other than the middle part of the arms 18 and 18' may rotate said arms sufficiently out of parallelism to cause the torsion stiffening spring to tend to slide in one direction or in the opposite direction along the border wires and thereby to become undesirably displaced. If the force is exerted near the bends 22 and 22' the torsion spring would tend to slide in the direction downwardly out of the figures as viewed in FIG. 1. If exerted at the free ends 19 and 19' of the arms, the torsion spring would tend to slide upwardly of the figure. The stops 27 and 27' prevent such sliding aided by the members 20 and 20'.

As shown best in FIGS. 1 and 2, the torsion stiffening spring is installed with the arms 18 and 18' held to the respective border wires 12 and 13 preferably adjacent to the end coils 16, by means of the border wire helicals 17 and 17'. The remainder of the torsion spring is directed inwardly away from the border wires and in a position wherein it does not interfere with any of the coils of the adjacent edge coil springs 14 during the application of and release of the load on the mattress and the corresponding compressive movements of the coil springs and torsion stiffening springs. Preferably, the U-shaped middle section comprising the torsion bars and connecting bend, is arranged inwardly of the middle turn of the adjacent coil spring and interiorly of the inner spring unit. When so installed, the torsion spring is prestressed by twisting the terminal arms 18 and 18' from the initial divergent relation thereof substantially into parallelism with the border wires. Such twisting exerts a preliminary torsional stress upon the inwardly inclined stress transmitting members 20 and 20' and also tends to move the bends 23 and 23' further apart due to the slight bending of said members.

The initial distance between the bends 22 and 22' at the ends of the terminal arms when the torsion stiffening spring is unstressed, is greater than the normal distance between the border wires 12 and 13 when the inner spring unit is not loaded. When the torsion spring is installed, the arms 18 and 18', beside being twisted, are also squeezed together to some extent so that they can be held properly to the border wires substantially in parallelism thereto. Such installing compression of the torsion spring puts it under an initial stress sufficient to increase its resistance to further compression and to prevent too easy yielding and lack of sufficient supporting characteristics inherent in spring devices such as edge stiffeners and stabilizers and others.

When the coil springs and torsion springs are compressed, the normally inclined stress transmitting members 20 and 20' more inwardly at the inner ends thereof as well as toward the horizontal as shown by the dash-dot lines of FIG. 4. In so doing, the bends 23 and 23' and the substantially U-shaped torsion section comprising the bars 21 and 21' move inwardly away from the compressed coils of the adjacent spring 14 and toward the space between coil springs as seen in FIG. 2. While compression of the torsion spring may bend the members 20 and 20' slightly, the main function of said members is to transmit the stress from the load receiving members, such as the terminal arms, to the torsion section. Such load-transmitting members tend to rotate in opposite directions in the manner of cranks about the respective torsion bars to which they are connected, and rotate said bars in opposite directions about the respective longitudinal axes thereof thereby to exert torsional stresses thereon as distinguished from the bending stresses in an ordinary "torsion" spring and in previous edge stiffeners. The bars 21 and 21' are of about the same length as the arms 18 and 18', where such arms are used, being substantially coextensive therewith and sufficiently long to take the torsional stresses applied thereto.

Since torsion resisting springs are the most efficient type of wire springs, it should now be clear that relatively thin wire may be used for the edge stiffener of mattress units according to the present invention. It will also be seen that no metallic members need be interposed between the upper and lower border wires at the edges of the mattress unit, so that the space there between is available for other purposes if required; that as many edge stiffening springs as desired may be used along the edges of the unit and installed at the most convenient points; that the leverage of the members 20 and 20' causes such members to transmit the major part of the compressive force put upon the torsion spring in the form of torsional stress applied to the U-shaped torsion section and that the various objects of the invention in its specific application to edge stiffeners and the like have been adequately attained.

In the modified form of the torsion spring of general application shown in FIGS. 7 and 8, the stops 27 and 27' have been omitted from the load receiving arms 18 and 18'. The bend 29 joining the curved members 30 and 31 is also shown as offset out of the plane of both of said members in the manner of the bend 24a of FIGS. 3 and 4. However, for the substantially mutually perpendicular members 20, 21 and 20', 21', constituting the greater parts of the respective C-shaped elements of the spring have been substituted the combined respective members 30 and 30'. As shown, said members are similarly curved and convex toward each other and are subjected to both bending and torsion in much the same manner as are the members 20, 21 and the like when the arms 18 and 18' are forced toward each other. Obviously, the members 30 and 30' may be in the shape of an open segment of any geometric outline and shaped in various combinations of curved and straight portions to meet various special conditions and to function best in torsion or combinations of torsion and bending as the specific application in which the spring is employed may require.

While certain specific forms of the invention have herein been shown and described, various obvious changes may be made therein without departing from the scope of the invention defined by the appended claims.

I claim:

1. A one-piece torsion spring free of coils and comprising a central torsion section having a pair of similar and coextensive torsion bars extending in transverse spaced relation to each other and a bend integrally joining the corresponding ends of said bars, and collapsible and extensible means at the ends of the bars remote from the bend, coplanar with the bars and normally extended for transmitting stresses to said bars to exert torsional stress upon said bars in opposite directions on the collapsing movement of said means, said means being urged by said bars and said bend to extend toward a normal unstressed position.

2. The torsion spring of claim 1, the bent portion being in a plane angularly related to the plane of the bars.

3. The torsion spring of claim 1, the collapsible and extensible means comprising a load transmitting member extending from each bar and a load receiving member extending from each load transmitting member, the plane passing through the load transmitting and load receiving members connected to one bar being angularly related to the plane passing through the load transmitting and load receiving members connected to the other bar.

4. The torsion spring of claim 3, the load transmitting member being substantially linear.

5. The torsion spring of claim 3, the load transmitting members having curved portions.

6. A one-piece wire torsion spring comprising an upper element open at one side only and closed at the top part, bottom part and the other side, and of the shape of a segment of a geometric plane figure, a similarly shaped lower element open at the same side, and a bend at said side integrally connecting the bottom part of the upper element in transverse spaced relation to the top part of the lower element, the aforesaid top and bottom parts of said elements being substantially parallel to each other, of substantially equal and coextensive lengths, said elements being arranged in different planes diverging outwardly from each other.

7. The spring of claim 6, the bottom part of the upper element and the top part of the lower element each constituting a torsion bar extending from the bend, and a stress transmitting connecting member on the torsion bar of each element extending in a direction away from the other element from that end of the bar remote from the bend and closing that side of each element opposite the open side.

8. In a one piece wire torsion spring, a substantially horizontal middle torsion section having a pair of substantially coextensive torsion bars and a bend integrally joining the bars and closing one end of the section, the other end of the section being open, an upper terminal arm generally parallel to and substantially coextensive with and arranged forwardly and upwardly of said section, a similarly lower terminal arm generally parallel to and substantially coextensive with and arranged forwardly and downwardly of said section, and connecting members one integrally joining the upper arm to the upper bar of the section and another integrally joining the lower arm to the lower bar of the section.

9. The spring of claim 8, each terminal arm having a free end proximate to the closed end of said torsion section, each connecting member joining the other end of an arm to that end of a bar at the open end of the section, each member lying substantially in the plane of the arm and bar connected thereby, the plane of the upper element consisting of the upper arm, upper bar and said one connecting member being angularly related to the plane of the similar lower element.

10. The spring of claim 9, each of the arms having a relatively short stop portion extending substantially perpendicularly from the free end part thereof, the torsion bars of said section being subjected largely to torsion tending to rotate said bars in opposite directions about the respective axes thereof when the arms are forced toward each other against the resistance of said section.

11. The spring of claim 9, the arms converging in a direction away from the free ends thereof whereby on the installation of the spring in a spring structure with said arms substantially parellel, the torsion bars and the connecting members are stressed to a sufficient extent to increase the resistance thereof to initial compression of the spring prior to the application of load to the structure.

12. In a one piece wire torsion spring, an upper substantially horizontal terminal arm, a lower substantially horizontal terminal arm, one end of each arm being free, a generally U-shaped torsion section arranged laterally of and between the arms and comprising an upper generally horizontal torsion bar, a lower generally horizontal torsion bar, and a bend joining the bars, the bars being substantially coextensive with each other and with said arms and in transverse spaced relation to each other, an upper inclined stress transmitting member joining the other end of the upper arm to the upper bar at the end of said bar remote from the bend, and a lower inclined stress transmitting member joining the other end of the lower arm to the lower bar at the end of said lower bar remote from the bend, whereby movement of the arms relatively toward each other about the respective bars as pivots, rotates the stress transmitting members bodily in opposite directions about the respective bars and rotates the bars about the respective axes thereof to apply torsional stresses thereto while moving the U-shaped section bodily and further laterally of the arms.

13. In an inner spring structure, an upper border wire, a lower border wire, rows of upright coil springs arranged between said wires, a torsion spring according to claim 8 arranged between said wires with the upper terminal arm held to the upper border wire, with the lower arm held to the lower border wire and with the bars in inwardly spaced relation to said border wires and the adjacent coil of a coil spring.

14. The spring structure of claim 13, and means for connecting the upper and lower arms to the respective border wires while the torsion spring is in a prestressed state wherein the arms are closer together than when the spring is unstressed.

References Cited by the Examiner

UNITED STATES PATENTS

| | | | |
|---|---|---|---|
| 2,773,543 | 12/1956 | Sandor | 5—262 X |
| 2,798,233 | 7/1957 | Robell | 5—351 |
| 3,161,408 | 12/1964 | Molt | 5—260 X |
| 3,200,417 | 8/1965 | Costello | 5—260 |

FRANK B. SHERRY, *Primary Examiner.*

R. D. KRAUS, *Examiner.*